June 26, 1962    J. H. SHEPLEY    3,040,652
WIRE SPLICER
Filed Sept. 25, 1959
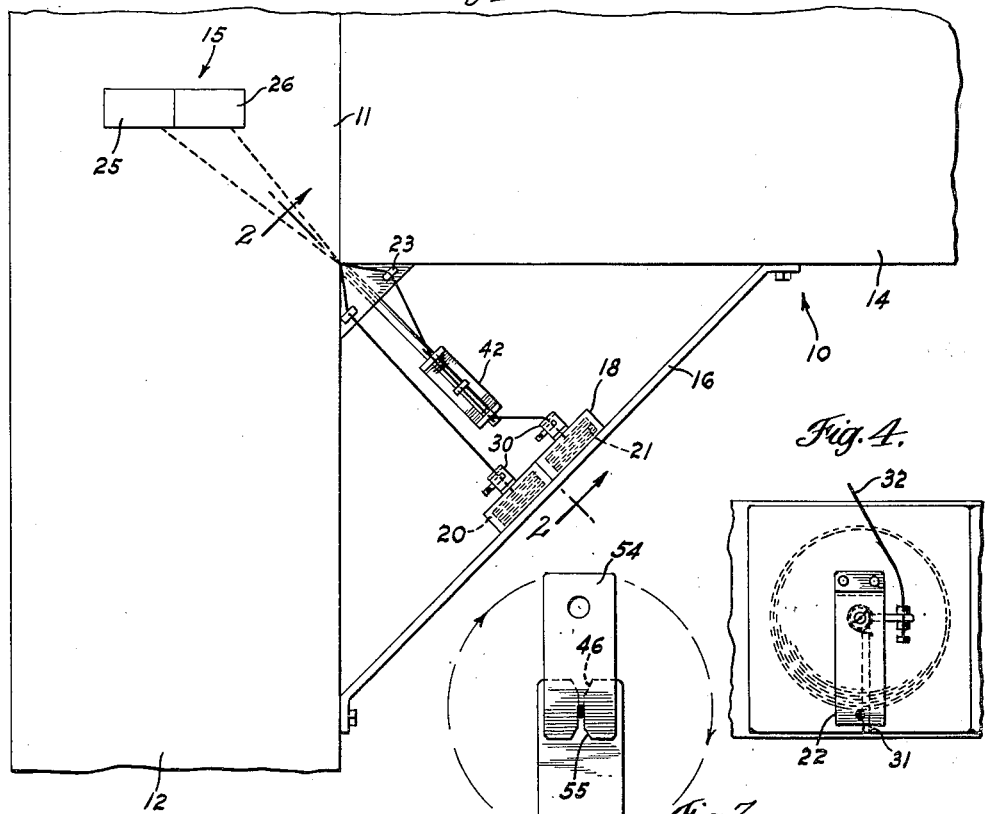
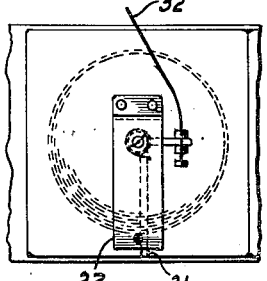
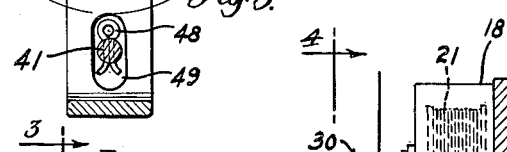
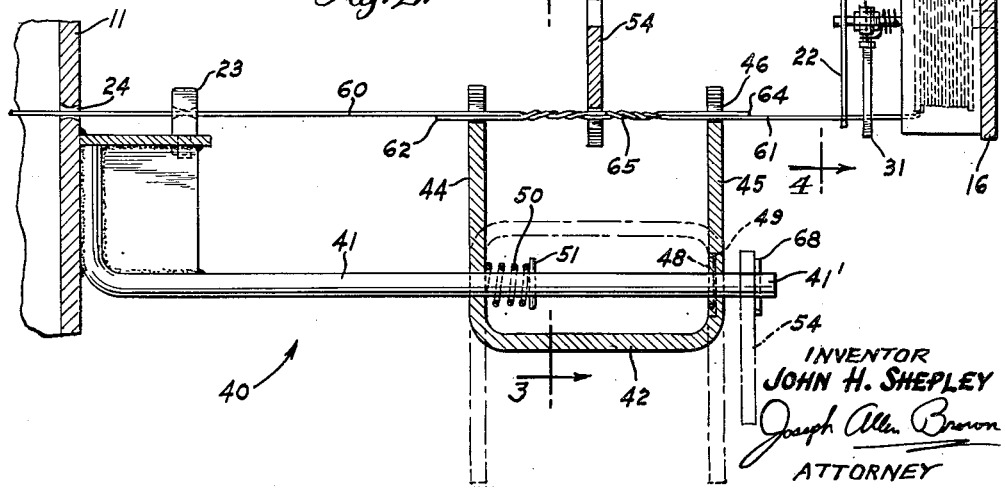
INVENTOR
JOHN H. SHEPLEY
Joseph Allen Brown
ATTORNEY United States Patent Office 3,040,652
Patented June 26, 1962

3,040,652
WIRE SPLICER
John H. Shepley, Lancaster, Pa., assignor to Sperry Rand Corporation, New Holland, Pa., a corporation of Delaware
Filed Sept. 25, 1959, Ser. No. 842,478
6 Claims. (Cl. 100—1)

The present invention relates to automatic hay balers and more particularly to wire tie balers.

A conventional automatic wire tie hay baler has two or three wire tying mechanisms mounted thereon each of which is adapted to tie together the coextended ends of a wire looped around a completed bale. A wire supply container is provided to supply the wire for banding each completed bale before it is discharged from the baler and onto the ground. There is a wire supply spool for each tying mechanism. It is common to provide signal means to let the operator of the baler know when a supply spool has become exhausted. The operator must then stop his baling operation and go back and place a new spool in the container to replace the exhausted spool.

Heretofore, it has been necessary for the operator to rethread the baler with the leading end of the new spool. The operator removes the short left over piece of wire from the previous spool and runs the lead end of the new wire spool up through the various wire guides to the wire tie mechanism which it supplies. In hay balers having needles which feed the wire upwardly from the bottom of the bale case, the rethreading of the wire is a difficult task. If the baler is located on a soft spot in the field it will tend to sink somewhat relative to the ground level when the baler is stopped and it often occurs that the operator has considerable difficulty crawling under the baler to perform the rethreading operation. Thus, the rethreading task is disagreeable; and it is time consuming.

Moreover, it rarely happens that more than one supply spool runs out at one time. Therefore, an operator may replace one spool and rethread such wire and being baling again only to have another spool give out after only a short lapse of time. Then the rethreading procedure must be repeated.

A main object of this invention is to provide a wire splicing unit whereby the tail end of an exhausted spool of wire and the lead end of a new spool of wire can be spliced together so that the baling operation can be continued without requiring the operator to crawl under the baler to rethread the lead end of the new spool.

Another object of this invention is to provide a single wire splicing unit which is so mounted relative to the containers for the wire spools that it is capable of being used in connection with a plurality of wire supply spools and tie mechanisms.

Another object of this invention is to provide a splicing unit which is mounted so that it can be swung to an operative position when in use and to an inoperative position when not in use.

A further object of this invention is to provide a splicing unit having simple means thereon for locking the unit in operative or inoperative position.

Another object of this invention is to provide a splicing unit having an inexpensive wire twisting tool provided therewith such tool being mounted on the splicing unit when not in use and fastened in place.

A still further object of this invention is to provide a splicing unit of the character described which is of simple construction and low cost and can be added to existing balers or balers in production.

Other objects of this invention will be apparent hereinafter from the specification and from the recital in the appended claims.

In the drawing:
FIG. 1 is a diagrammatic plan view of a hay baler having mounted thereon a wire splicing unit constructed according to this invention;
FIG. 2 is a section through the unit taken generally on the line 2—2 of FIG. 1 looking in the direction of the arrows and showing the splicing means in operative position in solid lines and in inoperative in dotted lines;
FIG. 3 is a section taken on the line 3—3 of FIG. 2 looking in the direction of the arrows; and
FIG. 4 is a section taken on the line 4—4 of FIG. 2 looking in the direction of the arrows.

Referring now to the drawing by numerals of reference, and first to FIG. 1, 10 denotes generally a hay baler comprising a fore-and-aft extending bale chamber 11 in which bales are adapted to be formed and delivered toward a rearward end 12 of the bale case for discharge onto the ground or delivery to a trailing wagon. Hay is picked up and delivered to the bale chamber through any conventional pick-up and feed mechanism contained in housing 14. If desired, such mechanism can be similar to that shown in U.S. Patent No. 2,757,602.

Mounted on top of the bale case 12 are a pair of wire tying mechanisms indicated diagrammatically at 15. Such mechanisms may be similar to that shown in U.S. Patent No. 2,822,749 wherein wire is delivered to the mechanisms by needles which project upwardly through the bale case from the bottom thereof. As is conventional, when a bale is being formed, wire becomes looped around the top, bottom and rear end of the bale. The needles engages the wires and deliver them around the forward end of the bale to complete the loops. Then the wire tying mechanisms cut and clamp the delivered wires and tie the ends of the loop together to provide a banded bale. All of such structure is conventional and constitutes no part in the present invention other than to establish the environmental use of the present device.

Extending diagonally from the rear end 12 of bale case 11 to the back of housing 14 is a bracket 16 which carries a container 18 adapted to hold two spools of wire 20 and 21 to supply the wire tie mechanisms. Wire extends from the spools through spaced guides 22 and 23 and through openings 24 in the bale case 12 and then to their respective wire tie mechanisms. The wire from the spools 20 and 21 supply the tying mechanisms 25 and 26, respectively. It will be understood, of course, that instead of two wire tying mechanisms and two spools, there could be three mechanisms and three spools, or other number.

Associated with each of the supply spools is a signal device 30 having a spring biased finger 31 which engages an associated wire and completes a circuit through a wire 32 to the engine operating the baler. When a spool runs out, the engagement of the finger 31 with the wire ceases and the engine is shorted out. This informs the operator that he has to go back and replace an exhausted wire spool. The specifics of the signalling device may be similar to that shown in U.S. Patent No. 2,712,042.

When either spool 20 or spool 21 becomes exhausted, the tail end of the exhausted spool is adapted to be spliced to the lead end of the new spool by means of a splicing unit 40 shown best in FIG. 2. Such unit comprises a support 41 in the form of a shaft which is welded at one end to the bale case 11 and extends outwardly therefrom and generally horizontally relative to the ground. The support is disposed between the wire tying mechanisms 15 and the wire supply container 18. Mounted on support 41 is a U-shaped member 42 having spaced legs 44 and 45 which constitute wire receiving anvils. Each anvil has an inwardly extending slot 46 which at its inner end at least is substantially the same thickness as the gauge of the wire in container 18. The slots in the respective anvils are identical and are aligned one with the other. Member 42 is mounted on the support 41 for swinging pivotal movement relative thereto from the solid line position to the dotted line position, FIG. 2. The support 41 has a detent 48 in the form of a cotter pin which extends through the support. The cotter pin projects into a notch 49 in the inner side of the leg 45. A spring 50 is provided which constantly biases the member 42 toward the bale case 11. Therefore, the detent 48 is continually pressed toward engagement with the anvil 45. The slot 49 is elongate and is adapted to receive the detent 48. By grasping the anvil 45 and pulling the member 42 axially to the right in FIG. 2, the detent 48 is removed from the slot 49 and member 42 can be swung downwardly to its dotted position. When swung to a downward position, the pull on the member 42 is released and the member assumes its normal position with the detent in the slot 49. Whether the member 42 is extending upwardly or downwardly, the detent 48 is able to drop into slot 49.

The wire splicing unit has a wire twisting tool 54 having a wire receiving slot 55 similar to the slots in the anvils. The slot 55 is of such depth that two wires can be laid in it. However, the width of the inner end of the slot is such that when the wires are disposed therein they seat one on top of the other rather than side by side.

The wire splicing unit is used as follows: In FIG. 1, the wire supply spool for the righthand tier has become exhausted. The wire tail end 60 of the exhausted spool is deposited in the anvils 44 and 45 with member 42 locked in operative position by detent 48. Likewise, the lead end 61 of the new supply spool is deposited in the anvils. Either wire end can be placed in the anvils first just so long as the wires are coextended and one laid on top of the other. When the wires are so positioned in the anvils, the tool 54 is used as shown in FIG. 3. The tool is projected between the anvils and slid over the coextended wires so that the wires are positioned in the inside end of the slot 55. Then the tool 54 is manually rotated to produce a twist 65 as shown in FIG. 2. Any desired number of twists can be provided such as three or four. Then, the spliced wires are manually lifted from the slots in the anvils and the end 62 is snipped off close to the tie to minimize interference of the splice with the wire guides when the wire is moved toward the tying mechanism. The tail end 64 can be removed or left on as desired since it will move through the guides free end last and will thus not tend to jam any of the guides.

Preferably, the twist 65 should not go into the tie at the wire tying mechanism but should pass through the tier before or after a tie is made. The experience of the operator can readily accomplish this by noticing the stage of completion of the bale when the wire ran out and having the tying cycle trip at an appropriate moment. Further, if desired, once the tail end and the lead end wires have been spliced together, the operator can pull the wire through the various wire guides to the tie mechanism to get the spliced portion past the tier. Then he can snip off the spliced section of wire. In either case, there is no necessity for the operator to crawl under the baler to rethread the lead end of the new spool through the various guides in the baler.

After a splicing has been performed, the operator pulls the member 42 axially to the right in FIG. 2 to release the detent 48 from the slot 49. Then he swings the member 42 to its dotted line position to get the anvils out of the way. When the anvils reach a vertically extended position, the detent 48 will re-engage the slot 49 and again lock the member 42 to the support 41.

The tool 54 can be mounted on the extended end 41' of support 41 and held in place by a pin 68 where it will be available when needed again.

The structure described is simple and can be added to existing wire tie balers. Very little expense is entailed. Nevertheless, it overcomes a heretofore irksome problem.

While this invention has been described in connection with a particular embodiment thereof, it will be understood that it is capable of further modification, and this application is intended to cover any variations, uses or adaptations of the invention following in general, the principles of the invention and including such departures from the present disclosure as come within known or customary practice in the art to which the invention pertains and as fall within the scope of the invention or the limits of the appended claims.

Having thus described my invention, what I claim is:

1. In an automatic hay baler, the combination of a wire tie mechanism, a support for a spool of wire to supply said mechanism, said support being spaced from said mechanism, guide means establishing a normal wire extension from said support to said mechanism and through which the wire passes, a splicing unit located between said mechanism and said support adjacent said normal wire extension for twisting together the tail end of an exhausted spool and the lead end of a new spool, the twist being of such size that it will pass through said guide means, means mounting said splicing unit on the baler for movement from said adjacent location to a position across said normal wire extension, said unit comprising a pair of spaced anvils for holding said tail and lead ends coextended, and a tool engageable with the coextended wires to twist them together.

2. An automatic hay baler as recited in claim 1 wherein each of said anvils is rigid and has a wire receiving slot of a width substantially the same as the diameter of the wire whereby when one wire end is placed in the slots of the anvils after a previously deposited wire, the wires rest one on top of the other.

3. An automatic hay baler as recited in claim 1 wherein said tool comprises a flat plate having a slot for receiving the coextended wires, said slot being of a width substantially the same as the diameter of the wire.

4. An automatic hay baler as recited in claim 1 wherein means is provided by locking said anvils in said normal location and in said position across the normal wire extension.

5. An automatic hay baler as recited in claim 4 wherein said anvils comprise the legs to a U-shaped member pivotally mounted on a support shaft, and said locking means comprises a detent on said shaft engageable with one of the anvil legs.

6. An automatic hay baler as recited in claim 5 wherein said U-shaped member is axially shiftable on said shaft to control the operation of said detent, and resilient means is provided to resist shifting of said member.

References Cited in the file of this patent

UNITED STATES PATENTS

| | | |
|---|---|---|
| 2,252,952 | Vieth et al. | Aug. 19, 1941 |
| 2,565,012 | Barrett | Aug. 21, 1951 |
| 2,584,035 | Lendle | Jan. 29, 1952 |
| 2,624,791 | Krow | Jan. 6, 1953 |
| 2,796,662 | Saum | June 25, 1957 |